May 26, 1970        R. E. YOUNG        3,513,703
EXHAUST GAS TEMPERATURE ANALYZING SYSTEM AND METHOD
Filed Oct. 9, 1967        2 Sheets-Sheet 1
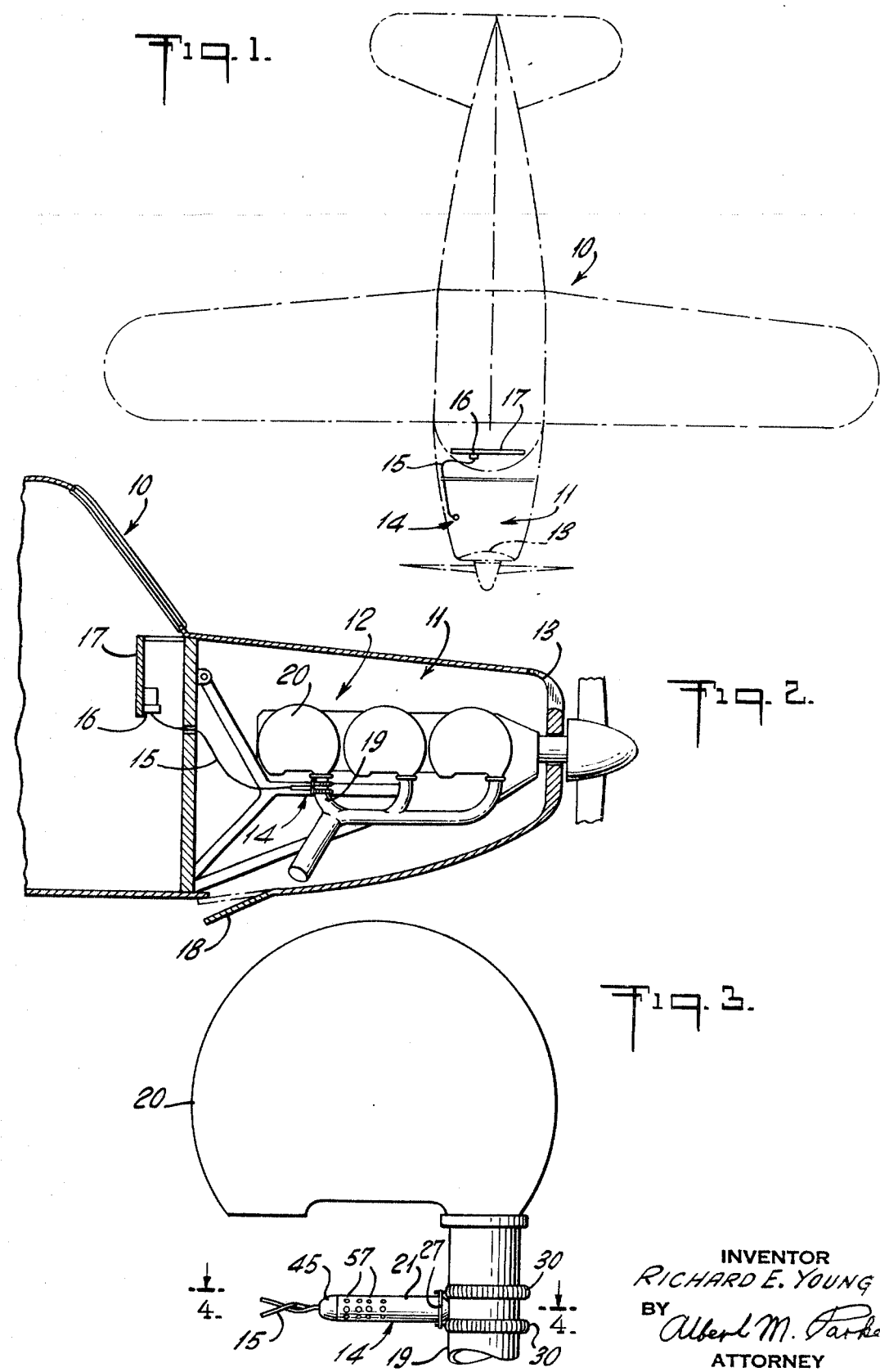
INVENTOR
RICHARD E. YOUNG
BY
Albert M. Parker
ATTORNEY

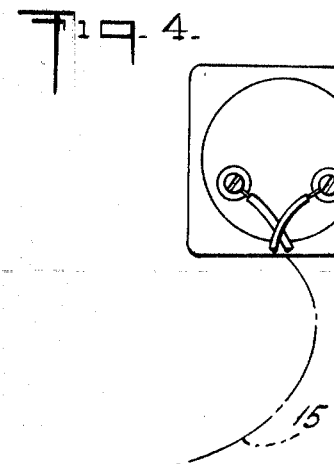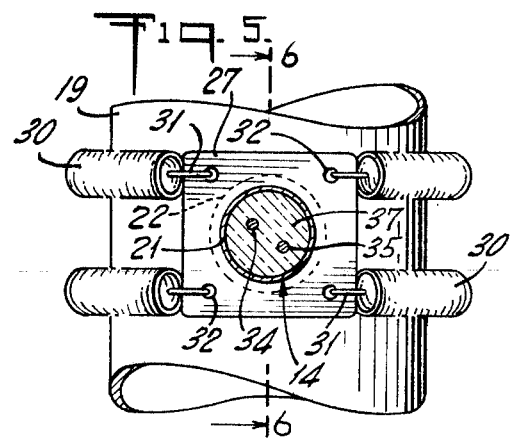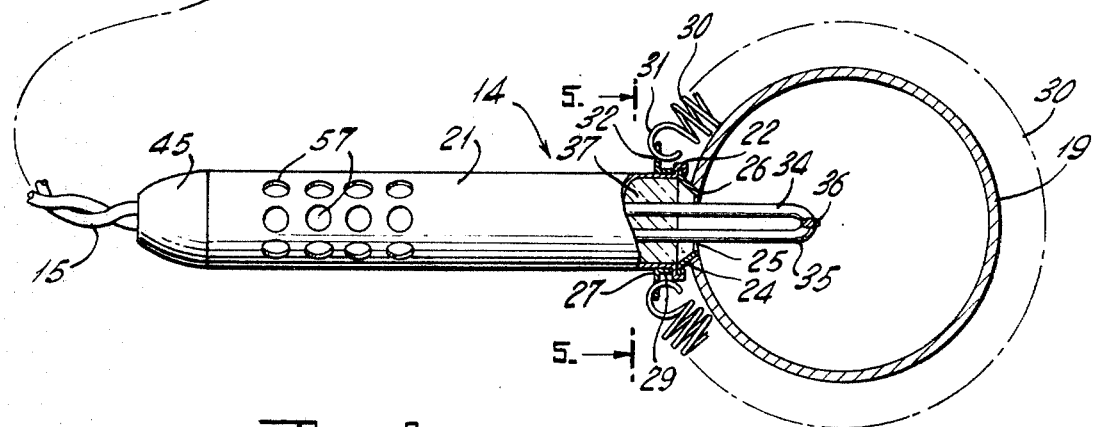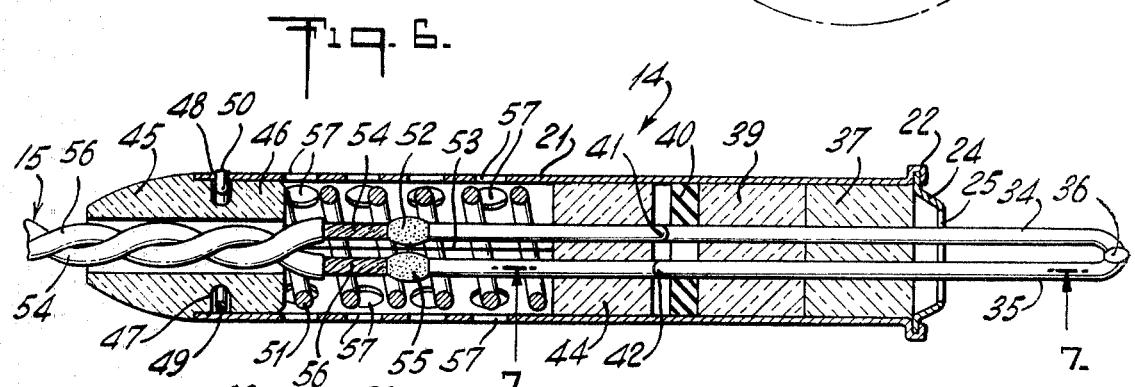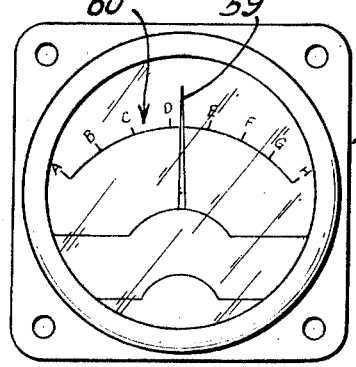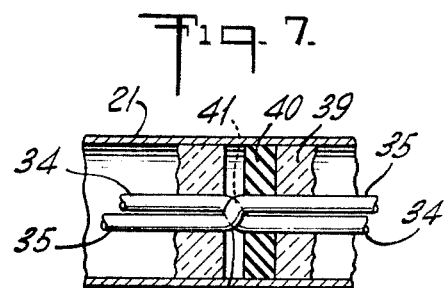

United States Patent Office 3,513,703
Patented May 26, 1970

1

3,513,703
EXHAUST GAS TEMPERATURE ANALYZING
SYSTEM AND METHOD
Richard E. Young, Rocky Hill, N.J., assignor to Unitwin
Corporation, Rocky Hill, N.J., a corporation of New
Jersey
Filed Oct. 9, 1967, Ser. No. 673,811
Int. Cl. G01k 1/14, 7/12
U.S. Cl. 73—346
11 Claims

ABSTRACT OF THE DISCLOSURE

Engine exhaust gas temperature analyzing system and method employing a novel thermocouple probe and a simple indicating meter. The hot junction of the thermocouple is disposed directly in the stream of exhaust gas in an exhaust stack; the cold junction is placed outwardly of the exhaust stack, but in the immediate environment of the engine exhaust system, whereby the temperature of the cold junction varies in a manner which is relatively proportional to the actual exhaust gas temperature, thereby partially compensating for variation in ambient conditions. Low resistance leads are employed between the probe and the indicator; such leads need not be of a fixed length for calibrating purposes.

BACKGROUND OF THE INVENTION

Field of the invention

The invention relates to a thermocouple temperature detecting and indicating system and method which are useful, for example, with an aircraft engine.

Description of the prior art

Thermocouple temperature detecting and indicating systems have been used for determining the temperature of the exhaust gases of internal combustion engines employed in aircraft so that the air-fuel mixture can be efficiently controlled. Such systems have been relatively complicated and delicate, since they attempt to give a reading on their indicators of the absolute or finite value of such exhaust gas temperature. In order to do this, the cold junction has been placed at a location of substantially constant temperature, such as in the cabin of the aircraft. Also, with such prior systems lead wires of fixed lengths and thus of known resistance must be employed between the thermocouple probe, the cold junction, and the indicating instrument of the system.

SUMMARY OF THE INVENTION

The temperature detecting and indicating system and method of the invention employ a thermocouple probe which extends into an exhaust of an exhaust stack of an engine. Such probe, which is of novel construction, includes a ventilated casing which is supported upon and extends outwardly from such exhaust stack and into the engine compartment. The casing of the probe is so constructed as to provide ready access of air in the engine compartment with the cold junction of the system, which is disposed within the casing of the probe. The cold junction is thus located in the immediate environment of the the engine exhaust system, whereby the actual temperature of the cold junction varies in a manner which is relatively proportional to the actual exhaust gas temperature. The cold junction is formed by joints between low resistance lead wires connected to a simple indicator, which in the illustrative embodiment is a millivoltmeter calibrated in arbitrary divisions between a known maximum temperature and a known minimum temperature. The system provides the airplane pilot with the information necessary to permit him to arrive at the optimum fuel mixture,

2 without the complexities and possible confusion which sometimes arise with systems which give readings of specific temperatures and temperature changes.

BRIEF DESCRIPTION OF THE DRAWINGS

FIG. 1 is a schematic plan view on a small scale of an airplane provided with the exhaust gas temperature analyzing system of the invention;

FIG. 2 is a fragmentary schematic view in side elevation of the engine, engine compartment, and instrument panel of the airplane of FIG. 1;

FIG. 3 is an enlarged view in side elevation of the head of one cylinder of the engine of FIG. 2, the view showing a portion of the exhaust stack of such cylinder and the thermocouple probe of the system of the present invention mounted thereon;

FIG. 4 is a view partially in side elevation and partially in section of the thermocouple probe and exhaust stack shown in FIG. 3, the section being taken generally along the line 4—4 of FIG. 3 looking in the direction of the arrows, the thermocouple probe being shown connected to an indicating meter;

FIG. 5 is a view in vertical section through the thermocouple probe adjacent the exhaust stack, the section being taken along the line 5—5 of FIG. 4 looking in the direction of the arrows;

FIG. 6 is view in longitudinal axial section through the thermocouple probe, certain of the parts being shown in elevation, the section being taken along the line 6—6 of FIG. 5 looking in the direction of the arrows;

FIG. 7 is a fragmentary view in axial section through the portion of the thermocouple probe at the location of the resilient gas sealing member thereof, the sectioning plane in FIG. 7 being disposed at 90° relative to that of FIG. 6; and FIG. 8 is a view in front elevation of the indicating meter connected to the thermocouple probe in the illustrative system of the invention.

DESCRIPTION OF THE PREFERRED EMBODIMENT

In FIGS. 1 and 2 there is shown an airplane, generally designated 10, in which the exhaust gas temperature analyzing system of the invention is installed. The airplane 10, which is of the single engine tractor type, has an engine compartment 11 in which is mounted an engine 12 which in this instance is of the opposed or flat 6-cylinder air cooled type. The engine 12 is cooled by air which enters the engine compartment through a grilled opening 13 of constant area at the front of the compartment and leaves it through an opening at the rear of the engine compartment, such latter opening being provided with an adjustable outlet flap 18. As is conventional with this type of airplane, the temperature of the engine is detected by a thermocouple (not shown) attached to one of the cylinder heads, such thermocouple being connected to an indicating meter such as a millivoltmeter (not shown) which is calibrated to give direct temperature readings, and is mounted upon the instrument panel of the airplane, here shown at 17. Under steady operating conditions the pilot adjusts the outlet flap 18 in accordance with the indications of engine temperature given by such engine temperature indicating meter, so as to maintain the engine at a desired substantially constant temperature.

The engine gas temperature analyzing system of the present invention includes a thermocouple probe 14 which is mounted upon an exhaust pipe of the engine, the thermocouple of probe 14 being connected through lead wires 15 to a millivoltmeter 16 mounted upon the instrument panel 17 of the airplane. In the illustrative embodiment, the probe 14 is mounted upon the exhaust stack 19 which is directly connected to the cylinder 20 of the engine 12, but it is to be understood that, if desired, the thermocouple probe may be mounted upon the exhaust manifold of the engine. The expression "exhaust pipe" employed herein is intended to cover both an individual exhaust stack connected directly to an engine cylinder and an exhaust manifold.

As will be apparent hereinafter, the thermocouple probe is provided with a hot junction which is disposed directly in the stream of exhaust gases within the exhaust pipe and with a cold junction which is disposed within the probe in the immediate environment of the engine exhaust system but outwardly of the exhaust pipe. Because of such location of the cold junction and the maintenance of engine temperature substantially constant under normal operating conditions, the temperature of the cold junction varies in a manner which is relatively proportional to the actual exhaust gas temperature, thereby partially compensating for variation in ambient conditions.

Turning now to FIGS. 4, 5, and 6, it will be seen that the thermocouple probe 14 is of generally elongated circular cylindrical shape and that it has a relatively thin housing tube 21 which, when the thermocouple probe is mounted as shown, extends generally radially from the exhaust stack 19. The housing tube 21 is made of high temperature and corrosion resistant metal such as stainless steel. The forward or inner end of the tube 21 is expanded or flared at 22 and is then bent radially inwardly over an outwardly directed flange on the rear of a nose member 24, thereby to form an annular, sealed joint connecting the nose member to the tube 21, as shown. Member 24, which may be made of a high temperature resistant metal such as Inconel, is of generally frusto-conical shape, and is provided at its forward inner end with a relatively large central hole 25 through which the dissimilar metal wires 34 and 35 of the thermocouple proper project.

The probe 14 is retained upon the stack 19 in the manner shown in FIGS. 4 and 5. The stack is provided with a hole 26 through the wall thereof, such hole being of such size and accurately reamed so that the nose element 24 partially protrudes thereinto and forms a seal therewith when the probe is thrust toward the stack. In order to maintain the probe in securely mounted and sealed relationship upon the stack, there is provided a retainer plate 27 having a central forwardly extending flange 29 thereon of such diameter as accurately to receive the body of the tube 21. The plate 27 is telescoped over the tube 21, the forward end of flange 29 abutting the rear of the annular flared joint-forming portion 22 of the probe housing. The plate 27 is provided with a hole 32 therethrough at each of its corners, such holes 32 providing for the attachment of the tangs 31 of the respective upper and lower coil tension springs 30 which embrace the exhaust stack 19. Such mounting of the thermocouple probe 14 maintains a secure gas tight seal between the housing of the probe 14 and the exhaust stack 19 under the varying temperature conditions at which the engine is operated.

The thermocouple wires 34 and 35 are of relatively heavy gauge so as to withstand the high temperature conditions existing within the exhaust stack. The forward ends of the wires 34 and 35 are bent inwardly toward each other and are welded at 36 to form the hot junction of the thermocouple. The wire 34 may be made, for example, of Driver Harris alloy #121, and the wire 35 may be made of Driver Harris alloy #122, such thermocouple being generally known as of the Chromel-Alumel type.

The thermocouple wires 34, 35 are supported within and insulated by insulating and gas sealing members 37, 39, 40, and 44 which are disposed within the forward end of the housing tube 21 with the member 37 abutting the rear end of the nose member 24 and members 39, 40, and 44 being disposed in that order rearwardly of the member 37. The members 37, 39, and 44 are made of ceramic high temperature resistant material such as steatite. These members have outer diameters such that they snugly and accurately fit within the tube 21 and have two radially spaced, longitudinally directed, aligned passages therethrough accurately and snugly receiving the respective wires 34 and 35. The member 40 is made of resilient high temperature resistant material such as silicone rubber; the member 40 has a relaxed outer diameter somewhat exceeding the inner diameter of the tube 21 so that when positioned within the housing tube as shown it forms a gas tight seal therewith. Member 40 is provided with two spaced passages therethrough which receive the wires 34 and 35, such passages having relaxed diameters somewhat less than those of the wires 34 and 35 so as to form gas tight seals therewith when the parts are assembled as shown.

In order to locate the thermocouple wires 34 and 35 and their junction 36 accurately with respect to the housing 21, such wires rearwardly of the gas sealing member 40 are offset or "joggled" in transversely aligned short S-curved sections or offsets 41 and 42, which are more clearly shown in FIG. 7. When the insulating member 44 is thrust to the right with respect to the housing tube, the forward end surface of such member engages the offsets 41 and 42 and thrusts them into firm engagement with the rear surface of the sealing member 40. This not only accurately locates the hot junction 36 of the thermocouple with respect to the housing 21, but insures that the insulating members 37, 39, and 40 will be maintained in tightly abutting relationship at all times.

The described assembly of thermocouple wires 34 and 35 and the mounting, sealing, and insulating members 37, 39, 40, and 44 are constantly forcibly thrust toward the forward or inner end of the housing by a coil compression spring 51 which acts between the rear surface of body 44 and the forward or inner surface of a rear bushing 45 which closes the rear end of the housing tube 21. Successive turns of spring 51 are appreciably spaced to permit the ready circulation of air between them. Bushing 45, which is made of metal such as aluminum, has a forward end 46 of reduced diameter which accurately telescopes within the rear end of the housing tube 21. Bushing 45 is retained in the tube 21 by a spring lock means which includes an annular spring clip 49 which is mounted within a transverse annular groove 47 adjacent the rear end of the portion 46 of the bushing 45. Clip 49 is provided with a radially outwardly projecting finger 50, the outer end of which is received within a hole 48 in the wall of tube 21 so as to prevent the bushing 45 from axial retraction from the tube.

The cold junction of the thermocouple probe is composed of a joint 52 between the rear end of the thermocouple wire 34 and a low resistance lead wire 54, and a joint 55 between the rear end of the thermocouple 35 and another low resistance lead wire 56. The lead wires 54 and 56, which may be made of copper, need not be calibrated as to resistance and so may be made of any requisite length. Such lead wires extend outwardly from the joints 52 and 54 through a central passage in bushing 45 and thence to the terminals of the indicating meter 16.

The joints 52 and 55 and the bared portions of lead wires 54 and 56, as well as the parts of thermocouble wires 34 and 35 rearwardly of the rear ceramic insulating member 44, are kept separated and electrically insulated from each other by a sheet 53 of suitable heat resistant electrically insulating material which extends between them as shown. At the location of the joints 52 and 55 and somewhat on both sides of them axially of the probe the housing 21 is provided with a plurality of holes 57 therethrough so that the air within the engine compartment in the immediate environment of the exhaust system of the engine may circulate through the holes 57, between successive turns of spring 51, and into intimate contact with the joints 52 and 55. Thus the cold junction composed of such joints 52 and 55 under normal steady operation of the engine will be maintained at a temperature which varies in a manner which is relatively proportional to the actual gas exhaust temperature.

The indicating meter 16, shown in FIG. 8, is a millivoltmeter having a needle 59 which cooperates with a graduated scale 60. Since the exhaust gas temperature analyzing system of the invention is not concerned with the determination of absolute values of such temperature, the scale 60 is graduated from a low temperature A to a high temperature H. In a preferred embodiment the graduations may each represent approximately 100° F. Such alphabetical index on the scale 60 permits the pilot to read and remember the maximum exhaust gas temperature without reference to specific temperatures in degrees F. Based on an observation of such maximum temperature, the pilot can adjust the fuel mixture for the engine to obtain the desired reading of the meter 16. Such adjustment of the fuel mixture will be based on instructions which incorporate the recommendations of the engine manufacturer for the desired operating condition, that is, maximum power or economy. Once having familiarized himself with such instructions and with the operation of the system of the present invention, the pilot can at any time under steady operating conditions of the engine attain a desired exhaust gas temperature.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus although an air cooled spark ignition internal combustion engine has been shown and described, it is obvious that the thermocouple of the invention may be used to advantage with other types of engines such as diesel engines and gas turbines, which are also internal combustion engines. It may also be employed to advantage with water cooled engines.

I claim:

1. In combination, an internal combustion engine having an exhaust system, an engine compartment housing the engine and at least the portion of the exhaust system which is directly connected to the engine, means for controlling the temperature of the engine compartment so that the temperature within the compartment in the immediate environment of the engine exhaust system may be maintained at a desired value when the engine is in sustained operation, said engine exhaust system having an exhaust pipe disposed within the engine compartment, and means for indicating the difference in temperature between the exhaust gas in the exhaust pipe and the air within the engine compartment comprising a thermocouple probe having an elongated housing, a thermocouple supported by the housing and having a hot junction and a cold junction, the hot junction being formed between the ends of two wires of dissimilar metals which project beyond the forward end of the housing, the two wires being enclosed within the housing along most of their length, the exhaust pipe within the engine compartment having an opening through the wall thereof, means mounting the housing of the probe upon and sealing it to the exhaust pipe at the opening therein with the housing projecting generally radially outwardly from the exhaust pipe and with the hot junction of the thermocouple disposed within the exhaust pipe, the thermocouple having a cold junction disposed within the housing outwardly of its zone of connection to the exhaust pipe but in the immediate environment of the portion of the engine exhaust system within the engine compartment.

2. The combination claimed in claim 1, comprising a voltmeter mounted remote from the engine compartment, low resistance lead wires made of a third metal and connected between the voltmeter and the thermocouple, joints within the housing between the rear ends of the two wires of dissimilar metals and the respective lead wires, said joints constituting the cold junction of the thermocouple.

3. The combination claimed in claim 2, wherein the wall of the housing is provided with a plurality of openings therethrough in the vicinity of the cold junction, whereby air in the engine compartment circulates freely into contact with the cold junction.

4. The combination claimed in claim 3, wherein the engine is an air cooled aircraft engine, and the means for controlling the temperature of the engine compartment comprises at least one flap to control the flow of air through the compartment, and means to control the degree of opening of the flap.

5. A thermocouple probe comprising an elongated tubular housing having a central longitudinal passage therethrough, a thermocouple with a hot junction located beyond the forward end of the housing and formed between two wires of dissimilar metals, said thermocouple having a cold junction, said wires being disposed longitudinally within the passage through the housing in laterally spaced relationship, said wires extending beyond the forward end of the housing to the said hot junction, means within the passage in the housing for supporting said wires therewithin and forming a gas-tight seal between the wires and the wall of the passage, said last named means comprising first rigid refractory electrically insulating means disposed within and spanning the forward end of the housing, said first rigid means having two laterally spaced longitudinally directed holes therein which receive and position the respective wires rearwardly of the hot junction, means for retaining said first rigid means against movement forwardly with respect to the housing, a resilient electrically insulating element disposed within and spanning the passage through the housing rearwardly of and in engagement with the first rigid insulating means, said resilient element having holes therethrough receiving the said wires and forming a seal between the wires and the inner wall of the housing, and positioning means for maintaining the resilient element in firm engagement with the first rigid means and the thermocouple wires in position axially of the housing, said positioning means comprising formations on said wires immediately rearwardly of and engaging the resilient element which prevent axial passage of the wires through the holes in such resilient element, second rigid electrically insulating means having holes therethrough receiving said thermocouple wires, said second means being disposed within the passage in the housing immediately rearwardly of and engaging the said formations on the wires, and resilient means within the passage in the housing which constantly urges the second rigid means forwardly with respect to the housing, whereby the said formations on the thermocouple wires are held in compression between the second rigid means and the resilient element.

6. A thermocouple probe as claimed in claim 5, wherein said two thermocouple wires of dissimilar metals terminate within the housing intermediate the length thereof, and comprising two lead wires of low resistance metal, joints between the forward ends of the lead wires and the rear ends of the thermocouple wires, said joints constituting the cold junction of the thermocouple, the housing having openings through the side wall thereof generally radially outwardly of the cold junction to permit access of the ambient atmosphere to the cold junction.

7. A thermocouple probe as claimed in claim 6, wherein the resilient means is an elongated coil compression spring disposed within the passage in the housing generally coaxial thereof and surrounding the cold junction, the successive turns of the spring being substantially spaced to allow the circulation of air therethrough, and comprising an abutment within the passage in the housing adjacent the rear end thereof, the coil spring extending and compressively acting between said abutment and said second rigid means.

8. A thermocouple probe as claimed in claim 7, wherein the lead wires extend inwardly through the rear end of the passage in the housing and longitudinally of the passage to the cold junction, the abutment at the rear end of the housing is in the form of a member forming a closure for the rear end of the housing, said closure member having an opening generally axially therethrough through which the lead wires extend, and comprising an elongated electrically insulating sheet member disposed in the housing between the rear ends of the thermocouple wires, the forward ends of the lead wires, and the connections between such wires constituting the cold junction of the thermocouple.

9. A method of determining the operating conditions of an internal combustion engine whereby the fuel mixture may be adjusted for greatest efficiency, comprising: detecting the relative difference in temperature between the temperature of exhaust gases flowing through an exhaust pipe of the engine and the ambient temperature in an engine compartment within which the engine is located, by disposing the hot junction of a thermocouple within the exhaust pipe for exposing the hot junction to the exhaust gases and disposing the cold junction of the thermocouple outwardly of the exhaust pipe but adjacent the exhaust pipe within the engine compartment at a location where the ambient temperature in the compartment varies in relative proportion to the temperature of the exhaust gases, and disposing means indicating the relative temperature detected by the thermocouple at a point remote from said cold junction without the engine compartment.

10. The method of claim 9 wherein the engine is an air cooled aircraft engine and comprising controlling the rate of flow of cooling air through the engine compartment.

11. A thermocouple probe adapted for detecting the temperature of the gases in the exhaust system of an internal combustion engine disposed in an engine compartment, the probe having an elongated housing and a thermocouple with a hot junction between two wires of dissimilar metals projecting beyond the forward end of the housing, the housing being adapted to be sealed at its forward end to an exhaust pipe forming a part of the exhaust system of the engine at an opening through the wall of the pipe and the hot junction disposed within the pipe, the thermocouple having a cold junction disposed within the housing at a zone substantially spaced from the forward end of the housing so that the cold junction may be located in the immediate environment of the engine exhaust system within the engine compartment, low resistance lead wires being connected at joints within the housing to rear ends of the dissimilar wires of the thermocouple, said joints constituting the cold junction of the thermocouple, the wall of the housing having a plurality of openings therethrough in the vicinity of the cold junction whereby air in the engine compartment may circulate freely into contact with the cold junction, means being provided within the forward end of the housing for supporting the dissimilar metal wires of the thermocouple and including resilient compressible gas-tight means sealing the wires to the housing, abutment means within the rear end of the housing, and a coil compression spring within the housing and acting between said abutment and said means supporting the dissimilar metal wires of the thermocouple to maintain the resilient compressible sealing means under axial compression, the spring being disposed between the zone of the housing having said openings therethrough and the joints constituting said cold junction, adjacent turns of the spring being substantially spaced to permit the circulation of air therethrough.

References Cited
UNITED STATES PATENTS

| | | | |
|---|---|---|---|
| 764,175 | 5/1904 | Bristol | 73—361 |
| 1,611,658 | 12/1926 | Magni | 123—41.59 |
| 2,750,916 | 6/1956 | Hanington | 73—343 |
| 3,154,060 | 10/1964 | Hundere | 73—346 |

S. CLEMENT SWISHER, Primary Examiner

DENIS E. CORR, Assistant Examiner

U.S. Cl. X.R.

73—361; 136—222